Wesley S. Ehrenzeller
Donald H. Call
INVENTORS

BY
ATTORNEY

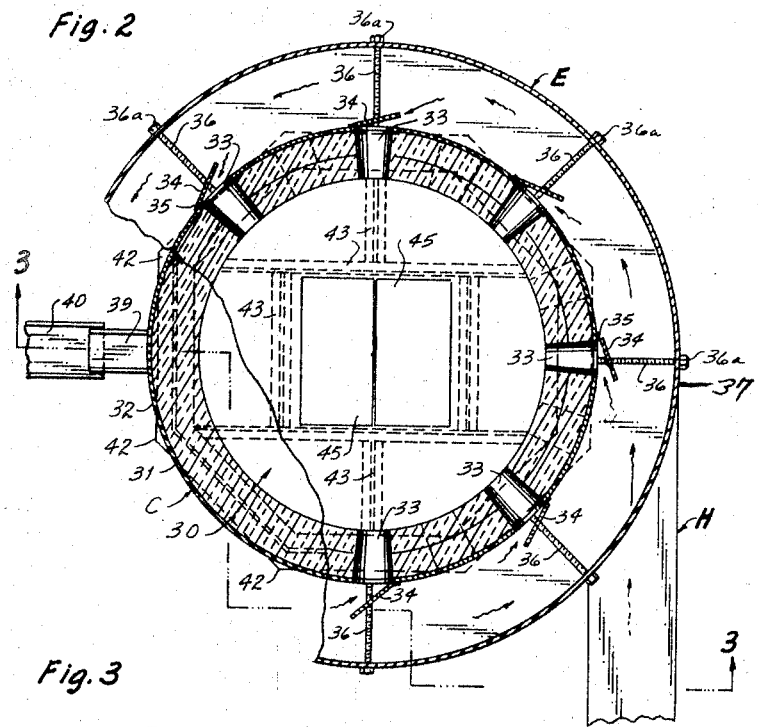
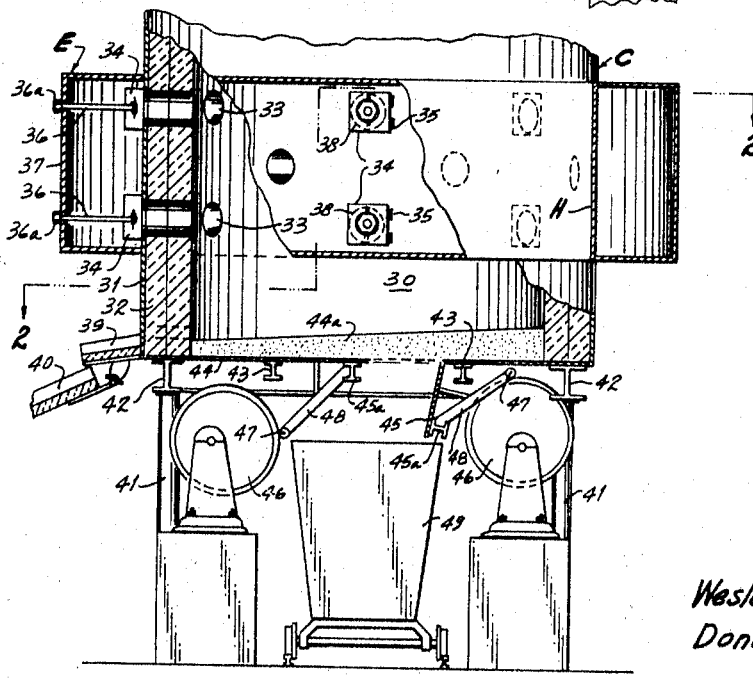

Wesley S. Ehrenzeller
Donald H. Call
INVENTORS

BY *Aaron Jushin*
ATTORNEY

Wesley S. Ehrenzeller
Donald H. Call
INVENTORS

BY
ATTORNEY

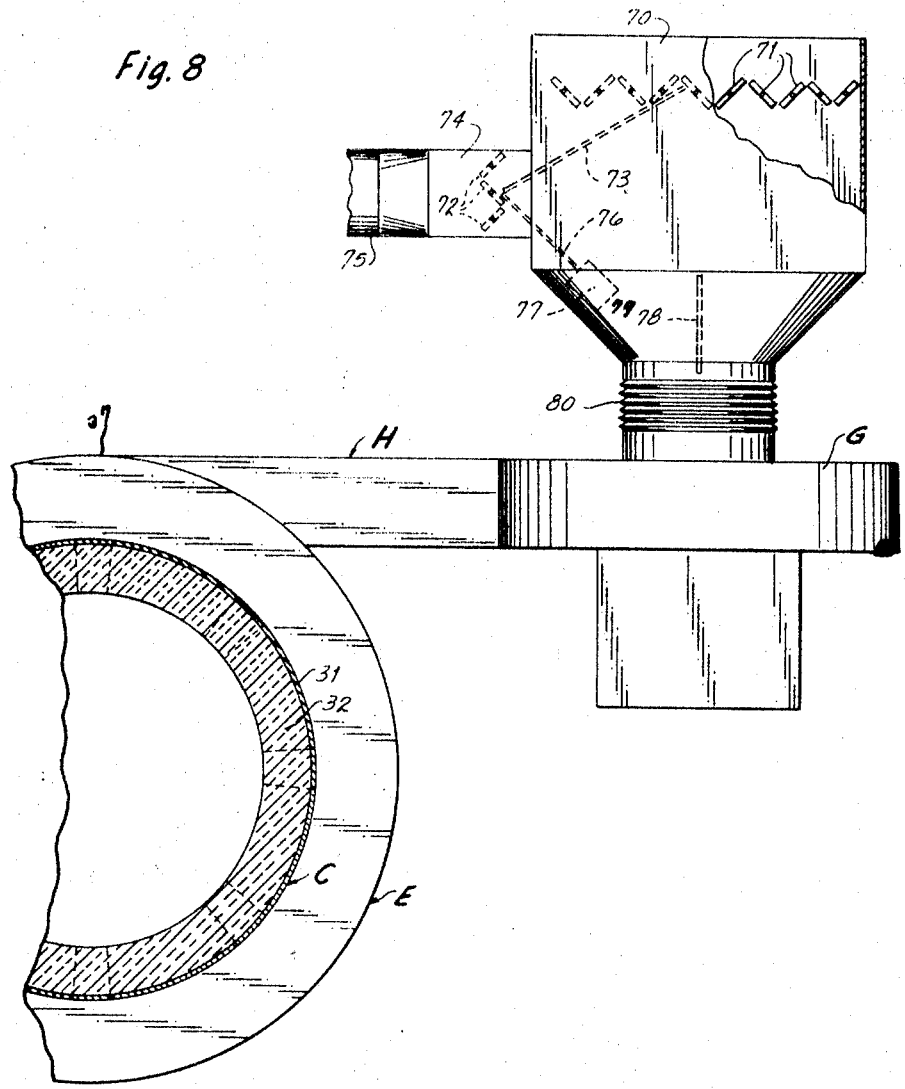

United States Patent Office 3,460,489
Patented Aug. 12, 1969

3,460,489
INCINERATOR
Wesley S. Ehrenzeller, Hanover, and Donald H. Call, West Roxbury, Mass., assignors to American Design and Development Corporation, Whitman, Mass., a corporation of Massachusetts
Continuation-in-part of application Ser. No. 447,593, Mar. 25, 1965. This application Apr. 8, 1968, Ser. No. 719,412
Int. Cl. F23g 5/12; F23k 3/02
U.S. Cl. 110—8                             5 Claims

ABSTRACT OF THE DISCLOSURE

The invention of this case is directed to the method and apparatus for the complete destruction of municipal-type waste products by incineration at critical high temperatures wherein combustion-supporting gases are controlled to enter a wind-box surrounding the vertical stack of the incinerator in an exclusively tangential direction to said wind-box; and in addition, a novel charging means for delivering said refuse to the combustion area of said stack.

---

This application is a continuation-in-part of applicants' pending application Ser. No. 447,593 filed on Mar. 25, 1965, entitled Incinerator, now Patent No. 3,412,696, granted Nov. 26, 1968.

This invention relates to an incinerator apparatus and the method of operating the same for the maximum disposal of municipal-type wastes. More specifically the present invention relates to a novel and most efficient means for forcing combustion-supporting gases, such as air, through a system of tuyeres located between a wind-box and the combustion area of the stack in the incinerator to effect controlled uniform distribution of said air for effecting maximum destruction of waste materials of organic and inorganic matter such as paper products, wood, refuse or trash including bottles, tin cans, stoves, refrigerators, etc. The invention also relates to novel means for controlled charging of the incinerator with accumulated refuse of all kinds of waste materials.

While it is true that the incinerator art is an old one and in limited present-day operation throughout the country, the prior art has nevertheless proven prohibitively expensive to build and operate, very inefficient in that complete combustion is not often attained, constant shut-downs for cleaning and repairs are necessary, and usually only partially useful for the disposal of all refuse such as newspapers, wooden boxes, garbage, and other sundry articles of organic material in combination with much inorganic material which is not heat volatile, but rather meltable or fuseable at high temperatures. In addition such common incinerators are notorious eyesores to the surrounding communities, creating escaping offensive odors, smoke, smog, and gaseous products of combustion. All these objectionable and undesirable effects tend to depreciate land values in the adjacent areas.

Accordingly, one object of this invention is to provide an incinerator assembly with a novel wind-box system with tuyeres therein which causes complete and uniform combustion of all dry or wet organic matter at very high controlled temperatures.

A further object of this invention is to provide such tuyeres with pressurized air uniformly distributed around a wind-box from which said air is controllably distributed into the combustion area of the stack of the incinerator through said tuyeres and which effects complete efficient combustion at such critically high temperatures as to melt all noncombustible material for periodic removal from the incinerator bed without necessarily removing all the bed contents for continuous combustion in the incinerator.

Another object of this invention is to provide a novel charging system for feeding the waste materials to the combustion area of the stack of the incinerator to maintain the combustion chamber at predetermined high and constant operating temperatures and in addition to prevent dangerous flash back from the uprushing gases of combustion and undesirable admission of cool air to the stack.

Another object of this invention is to provide the wind-box with pressurized combustion-supporting gases from its source in a direction exclusively tangential to said wind-box for uniform distribution of said gas around the entire wind-box for controlled entry through tuyeres to the combustion area of the stack of the incinerator.

Another object is the means whereby the elimination of selective handling and/or charging of the incinerator is effected.

Another object is to effect the consummation of rather large quantities of wet materials, such as garbage; reduce metal and glass articles such as tin cans, bicycles, bottles, etc., to their lowest common denominator in a fuse state, thus avoiding selecting feeding or mechanical separation without or within the combustion chamber.

To effect these objects and such other objects as may hereinafter, reference is made to the accompanying drawings, forming a part hereof, in which:

FIGURE 2 is a magnified cross-sectional plan view of the wind-box tuyeres taken on line 2—2 of FIGURE 3;

FIGURE 3 is a detailed cross-section view of the clean-out arrangement below the wind box showing the two exit hatch doors thereof, one in open position and the other in closed position; with a hopper car thereunder in position for catching and removing the clean-out material away from the incinerator.

FIGURE 8 is a sectional plan view showing the general arrangement of the fresh air intake and damper linkages for fresh air and emission return intakes to the forced draft fan.

Figure 1:
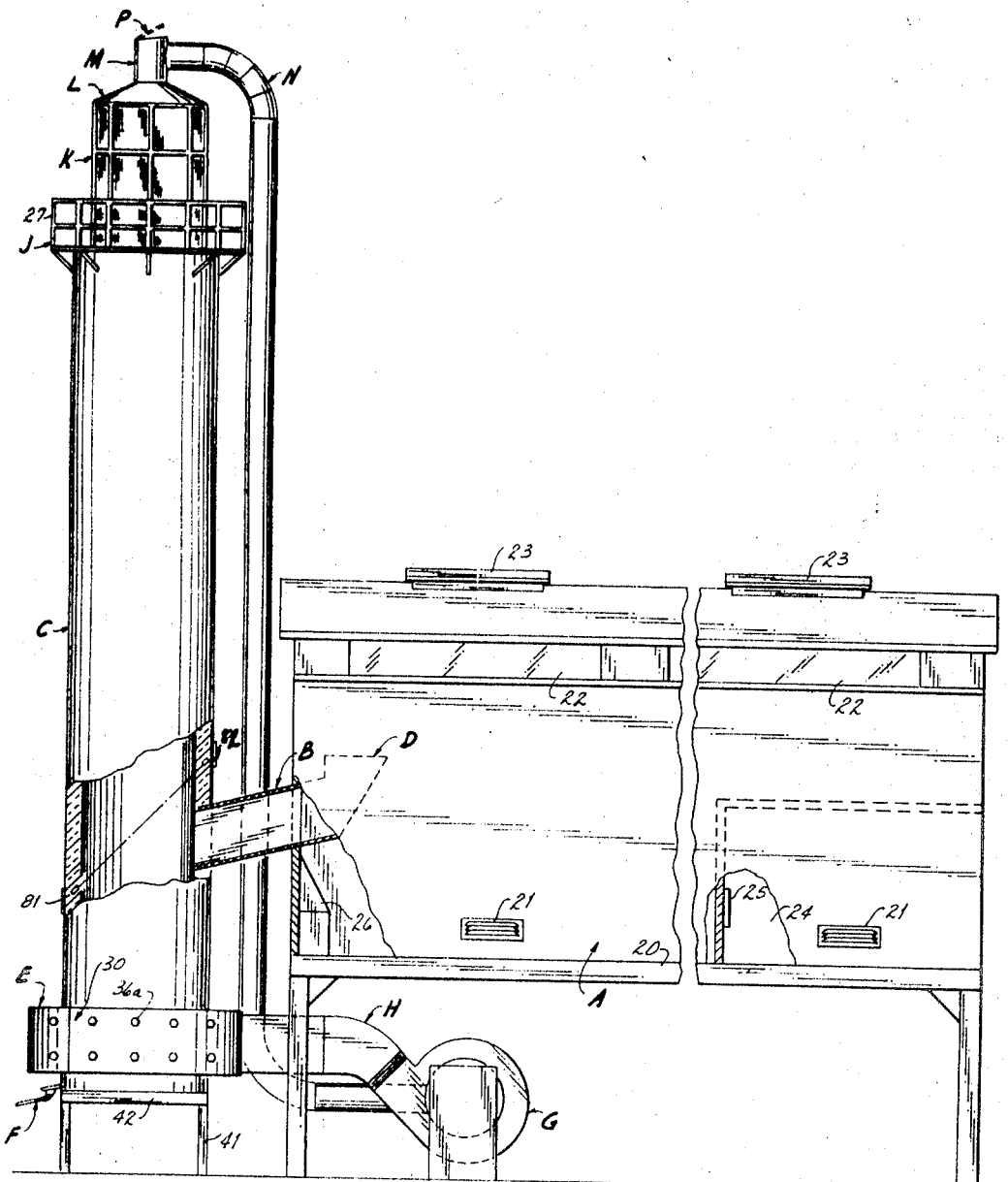
FIGURE 1 is a side elevation of the complete assembly of the incinerator with parts broken away at various sections thereof to show the details of some of the important components thereof in accordance with this invention.

Referring now to FIGURE 1, the overall device consists of a raised receiving building, generally indicated as A which is of any suitable construction such as metal or masonry with preferably a concrete floor 20, ventilation louvers 21 near the floor, windows 22 near the eaves, and either continuous or intermittent ridge vents 23 at the roof ridge. At the end of the receiving building there should be an office area 24 containing, in addition to usual office appurtenances, an indicating panel 25 which would include certain emergency controls considered necessary to the safe overall operation and supervision of the incinerator complex. Receiving doors (not shown) might be located on either or both sides of the building as may be convenient to the operation.

At the opposite end of the receiving building is located a main control console 26 for the remote operation of the various components. Also at this end is a charging chute with an outside attached hopper, generally indicated by the letters B and D, respectively, described in detail in the following paragraphs. The charging chute is directly connected from the receiving building to the tower or stack of the incinerator, generally indicated by letter C, and which contains the main components to be described in detail in the followig paragraphs. In the partial section of the stack C can be seen the lower end of the charging chute B as well as the general location of an electric eye control 81–82, the wind box E and residue spout and flow pan F. Below the receiving building A can be seen the forced draft fan G and a duct H from the fan G to the wind box E. Near the top portion of the stack C is a circular maintenance platform J, a multi-sided stainless steel vertical screen K, a frustoconical solid cap L with its attendant vertical stack M and explosion relief cap P, and finally an emission return duct N which joins the intake portion of the forced draft fan G at the foot of the stack.

FIGURE 2, in its partial sectional plan view on line 2—2 of FIGURE 3, shows correlative positioning of the combustion area generally indicated by the arrow 30, enclosed by an outer metal shell 31 which is, in essence, the main structural member of the stack, extending from the supporting legs and base upward to the platform area near the top of the stack. Immediately within the outer shell 31, which also forms the inner wall of wind box E, continuously from the bottom to top is an insulating layer of high temperature fire brick 32, with three or more tiers or rows of apertures of tuyeres 33 around the periphery of the combustion area. Shown in this FIGURE 2 and in FIGURE 3, is one preferred arrangement of these apertures 33 in which the top and bottom rows of apertures have damper-type doors 34, hinged as at 35 to draw into the combustion area the forced air received in the wind box E from the forced draft Fan G via the duct H. As can be noted in FIGS. 2 and 3, the damper doors are controlled individually by means of a threaded bolt 36 with bolt-head 36a, rotatably maintained in the outer wall 37 of the wind box E and threadedly engaged through a pivotally maintained nut 38 within damper doors 34. The tuyere system as here described is a critical feature of the disclosed invention as applied to the present incinerator structure.

Referring again to FIGURE 3, as well as FIGURE 2, it can be seen that the wind box E surrounds the tuyere assembly circumferentially about the cylindrical stack shell 31, and that this arrangement, together with the supplemental fuel as hereinafter described, generates most efficiently, quickly, and effectively the extreme high temperature desirable in the reduction of waste to 2% or less by weight, and resulting in the molten residue, which when cooled by the atmosphere, is virtually odorless, and could conceivably be ground up for use as sanitary land fill, concrete aggregate, or other, as yet undiscovered uses.

In FIGURE 3 other components are shown pertinent to the disposal of the molten effluent (or residue) such as the residue spout 39 and a portion of the hingedly movable flow pan 40. Supporting the tuyere structure are legs 41, beams 42 and joists 43 and metal flow pan 44. Hatch doors 45, one in open position, the other in closed position, are hingedly affixed to the floor joists 43 and are actuated by cammed roller drums 46 which co-act upon rollers 47 attached to one end of arms 48 which at their opposite ends are rigidly affixed (by welding, bolting or other suitable means) to the leading portion of the underside of the hatch doors 45, such edge being stiffened by a structural member 45a; Preferably mounted upon rails or tracks of suitable nature is a rolling hopper car 49 to receive cleanout residue whenever required. It will be further noted that a layer of hard packed sand 44a is placed upon the floor of the burn area in such a manner as to provide a slope toward the effluent spout and simultaneously effecting insulating bed for the burn area. This insulating bed may, however, be constructed of other high temperature materials of a more permanent nature and may actually be a part of the floor and of the hatches as well. There are several functions of the cleanout as follows: (1) to restore the insulation bed (sand) when necessary; (2) to restore the refractory lining (firebrick, spray type plastic refractory lining); (3) for safety inspection such as weaknesses in the wall of the stack which would require repairs to prevent possible explosions due to cracks or fracture causing hot spots and finally breaks, such possible explosions which could be extremely disastrous.

It is particularly pointed out that, as clearly shown in FIGURES 2 and 8, the duct H join the wind box E tangential to the inner and outer walls, 31 and 37, and accordingly the combustion-supporting gases from fan G enter wind box E in an exclusively tangential direction thereto. This feature causes uniform distribution of gases to all the tuyeres around the entire circumferential area of the wind box, resulting in more uniform, in contradistinction to "spotty," burning of the refuse inside the combustion area of the stack.

Figure 4:
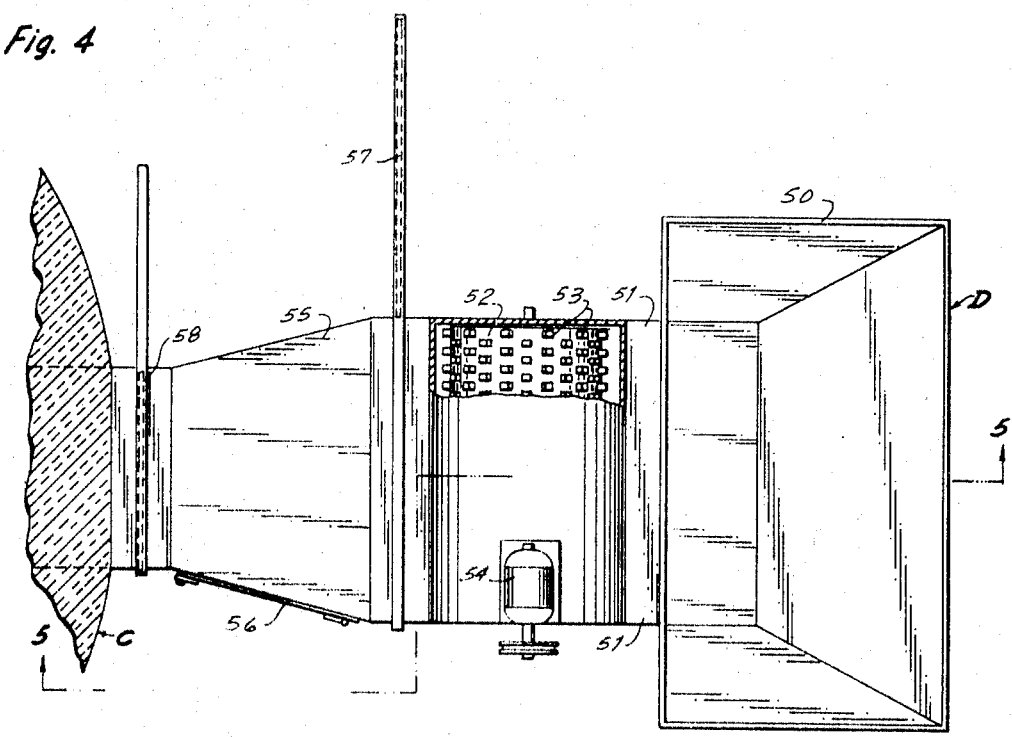
FIGURES 4 and 5 are plan and elevation views, respectively, of one preferred apparatus for charging the refuse into the combustion chamber.
Figure 5:
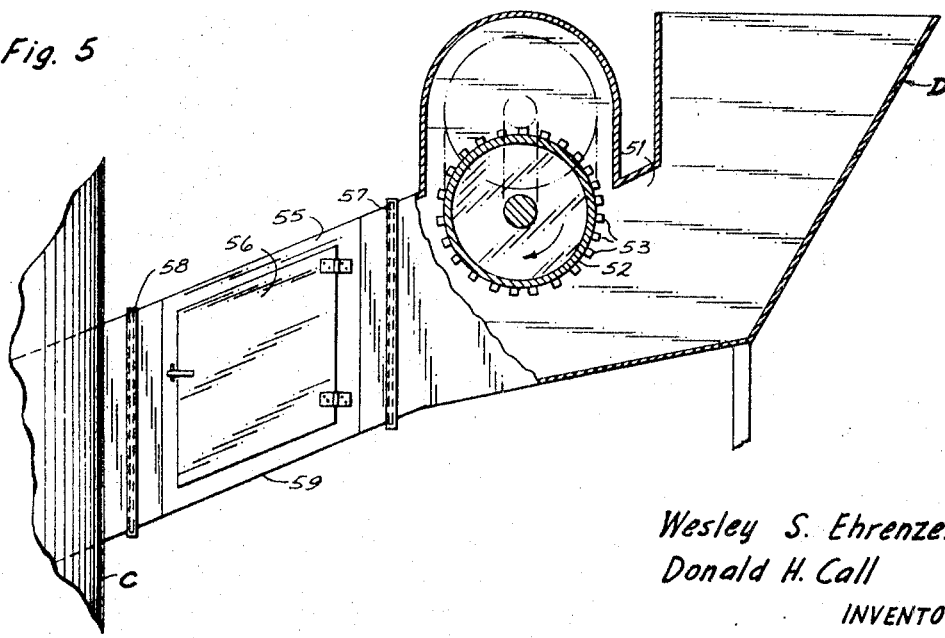

FIGURES 4 and 5 show the means of one preferred system of charging the waste at or above the combustion area of the incinerator stack in which there is a receiving hopper 50, a downwardly slanted throat 51, a vertically movable spring-loaded drum 52 having suitably shaped teeth or protuberances 53 mounted upon its peripheral surface, such drum being rotatably powered by an electric motor 54 or other means, in a manner which is not shown, but is well known to those practiced in this art, which enables the motor to remain in constant mesh or drive with the drum as it rotates clockwise to urge the waste forcibly into an enclosed trough or chute 55 which also acts as a charging chamber, and thence into the combustion area of the stack. The chute is provided with an access door 56, and two horizontal sliding doors 57 and 58, respectively termed charging door and charging chamber door, in sequential manner to receive, hold, and discharge the waste as required to keep the combustion chamber at proper and constant operating temperatures. Another very important function of these sequential coacting doors in the charging mechanism is to prevent dangerous flashback and/or undesired admission of air. In addition, the sloped floor 59 of the holding chamber (FIG. 5) is constructed in a manner which causes vibration (not shown) which, coupled with gravity, allows the waste to slide into the combustion chamber when the door 58 is opened.

Figure 6:
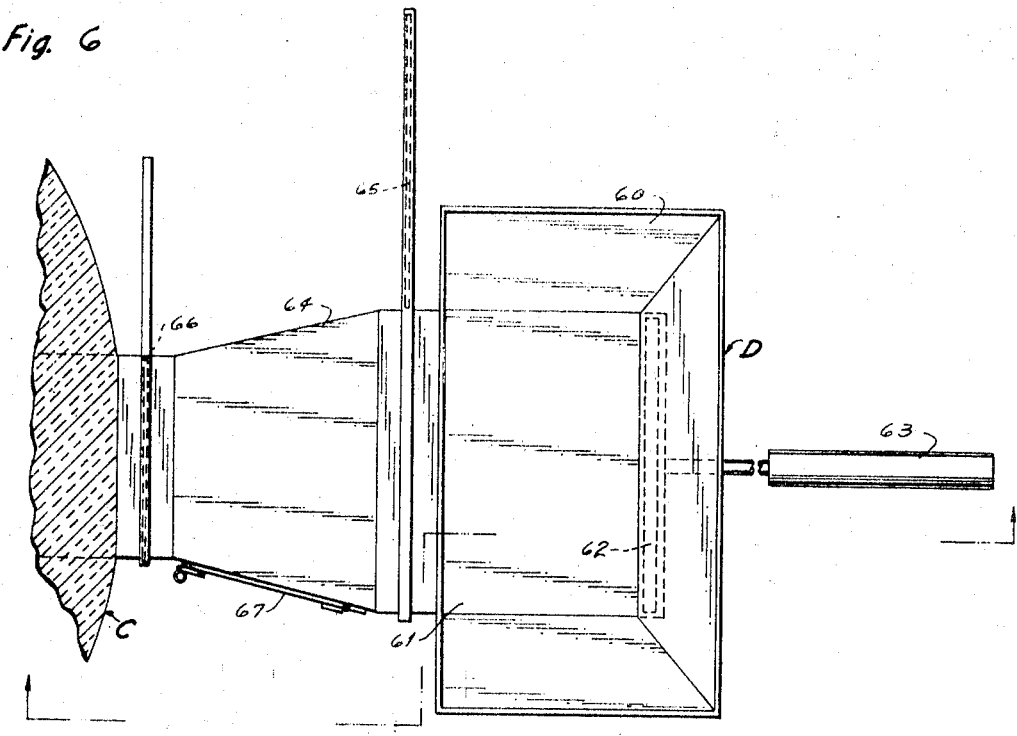
FIGURES 6 and 7 are plan and elevation views, respectively, of another preferred method of charging the refuse into the combustion chamber.
Figure 7:
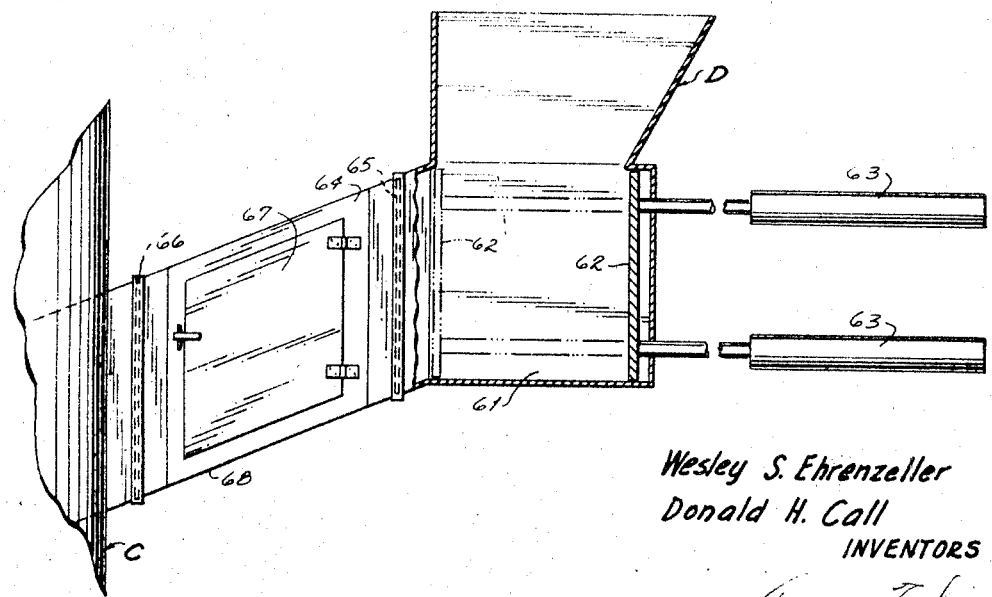

FIGURES 6 and 7 show another modified system of charging the waste into the incinerator in which there is a receiving hopper 60, a throat 61, a generally vertically positioned pusher plate 62 actuated by a multiplicity of horizontally mounted hydraulic or air actuated cylinders 63 which urge the waste toward a holding chamber 64 with horizontal sliding doors 65 and 66, respectively, an access door 67 and a vibrating floor 68 as similarly described in the preceding paragraph.

FIGURE 8 shows the plan arrangement of the forced draft fan intake and damper linkages, the exclusive tangential entry of presurized gas from Fan G through duct H into wind box E. The quantity of air being introduced is controlled through the use of a fan, wind box and tuyere arrangement to maintain the coke burning area at high temperatures, and other inter-related components as follows; a fresh air intake 70 of rectangular cross section contains a multiplicity of opposed blade or butterfly dampers 71 which are interconnectly linked by means of a drive shaft 73 to another group of opposed dampers 72 located within the throat 74 of an intersecting duct 75 which comprises the lower portion of the emission return duct N hereinbefore described. The two sets of dampers and their attendant linkage are suitable connected by means of a drive shaft 76 to a reversible electric damper motor 77 which is remotely controlled in the receiving building at the main console 26. There is another opposed blade damper 78 located within the conical throat 79 which is actuated by a second damper motor (not shown), remotely controlled from the main console 26. Also, there is a frusto-conical throat 79 connected to a flexible duct 80 to the intake portion of the forced draft fan G. Hence, it can be seen that a suitable arrangement has been devised for the effective admission of fresh air together with the re-introduction of undestroyed waste matter and hot air via the return emission duct N. The primary purpose of return duct N is to return the escaping hot air into the combustion chamber and thus reduce the use and cost of the supplementary fuel, and also to maintain the constant high temperatures necessary for the reduction of the non-combustibles as well as to eliminate offensive odor and smoke.

In summarizing the operation, waste is deposited in the receiving building A, emptied into the charging hopper D, metered thence into the combustion area 30 through chute B with an over-riding electric-eye control 81 and 82 to prevent overload, incinerated quickly and throughly, screened efficiently at K at the top to prevent undesired disbursal of unburned fly-ash waste, safety valved with an explosion relief cap M, through a return emission duct N for undevoured waste, and having adequate means for removal of non-combustible materials and resulting in a residue effluent and a means of access for cleaning and inspection via hatch doors 45 or through access door 65 of chute B.

It has been found that in order to completely burn municipal rubbish including organic and inorganic materials as referred to hereinabove, temperatures of from about 2500 degrees F. to about 3500 degrees F., and preferably above 2800 degrees F., are required to produce smokeless and odorless incinerator operation conditions within the confined space of the same. In order to effect these temperatures, it is necessary that a supplementary fuel supply such as coke, or coal with proper and ample quantities of air over said coke, be available for the combustion of municipal refuse of all kinds. The quantity of air being introduced is controlled through the use of a fan, wind box and tuyere arrangement to maintain the coke burning area a thigh temperatures. One of the important features of the present invention is the multilayer tuyere system, preferably, but not necessarily, staggered, and controlled as to volume of air fed to the chamber at its base (windbox and tuyeres) as described hereinabove producing the results desired. Under favorable conditions even a single layer of tuyeres surrounding the burning area produce favorable results; but multilayer tuyeres, the maximum efficiency. As shown above, it will be apparent that the controlling of the size of the openings and number of said tuyere ports by means hereinbefore described, the proper volume of air is available at a uniform rate to all sections of the burning chamber which also effects proper turbulence within said chamber during burning and prevention of air channeling. In this manner proper high temperatures are sustained to effect a tremendous reduction of all the refuse forms. It has been found that as many as twenty-four or more ports are necesary for obtaining the required results. Such materials as glass, tin cans, tricycles, and other metal objects, mixed in reasonable proportions with paper, boxes, and other combustible materials are reduced to molten mass in liquid form. This type material flowed out from the surface of the base sand bed as a black colored glass-like substance and upon cooling was very hard and adaptable for many uses similar to cinders. No smoke and very little if any objectionable odors are obtained from the incinerator. As an example only of the size of incinerator successful in its present use is noted to be: open spaces under the stack about five feet; height of stack, fifty-two feet; height of the screened section, nine feet; diameter of the stack, ten feet. It will be apparent that variations in the overall proportions can be reasonably ascertained to produce the results sought.

The function of the multi-sided fly-ash screen device is to restrict the passage of solid particles to the outside air without restricting the air flow passing through the stack. It was furthermore found that the use of at least a five-sided screen, and preferably a six (hexagonal) and most effectively an eight sided (octagonal) screen effects an arrangement of maximum air distribution, maximum contral of fly-ash, minimum cost and lowest maintenance.

The charging chambers are constructed of such a volume as to facilitate the quantity of supplementary fuel to be added through the chute to the incinerator as well as the waste materials to be disposed; and the charging door and charging chamber door are so arranged that the chamber door is always closed when the charging door is open and vice versa, to eliminate the possibility of creating unnecessary turbulence and draft within the stack as well as to avoid flashback.

It will be apparent that wide variations may be made from the forms of the invention herein disclosed without departing from the spirit of the invention and within the scope of the appended claims.

Having thus described the invention and illustrated its use, what is claimed as new and what is desired to be secured by Letters Patent is:

1. A device for the disposal of municipal-type waste material by incineration, the device comprising: a substantially vertical stack, a top enclosing frustoconical baffle element, a return by-pass duct positioned above said baffle element and extending downwardly outside the stack from said baffle element for emission return of fly-ash and hot gases into the lower combustion area of said stack, means for supplying municipal-type waste material into the stack at or above the combustion area in said stack, a tuyere assembly situated around the combustion area of said stack near the bottom of the incinerator, a circumferentially located wind-box extending around said tuyere assembly, means for forcing air and said fly-ash and hot-gases into said wind-box comprising a fan and a duct extending therefrom joining said wind-box tangentially to the inner and outer walls of said wind-box, at least one layer of circumferentially spaced air inlets to the stack in said tuyere assembly, means at the bottom of said incinerator to provide access to the combustion area, and means to permit removal of the final combustible products from said incinerator.

2. In an incinerator mechanism including a substantially vertical stack, a combustion area adjacent to the bottom hereof, a chute for controlled charging of said incinerator above said combustion area, and means at the bottom of said stack for removing molten incombustible products, the improvement comprising: a wind-box surrounding the outside of the lower area of the combustion area, means for supplying combustion-supporting gases from a forced fan mechanism into said wind-box in the direction exclusively tangential to said wind-box, a tuyere assembly into which combustion supporting gas is supplied from said wind-box into said stack under super-atmospheric pressure, said tuyere assembly having at least one row of horizontally spaced tuyeres for passing said air into the combustion area of said stack, said tuyeres each having adjustable means for controlling the volume of the forced air flow to said combustion area from said wind-box.

3. The method for the destruction of municipal-type waste material by combustion in an incinerator having a substantially vertical stack, said combustion being effected in a lower zone thereof, the combustion-supporting air being supplied to said combustion area below or at the waste supply level from a forced fan mechanism into a wind-box surrounding at least a portion of said combustion area outside said stack and from the latter through spaced tuyers ports into said combustion area of the stack, at least a portion of the combustion gas in conjunction with yet unconsumed waste material being returned from the upper portion of the stack into the combustion-supporting air, the improvement comprising; passing said combustion-supporting air under super-atmospheric pressure into said wind-box in a direction exclusively tangential thereto, supplying controlled volumes of said air to the combustion area of the stack through at least one row of said spaced tuyere ports, maintaining the temperature in said combustion area between 2500 F. and 3500 F. to cause substantially complete destruction of the waste fed into said stack, intercepting at the top of said stack fly-ash material swept up by said air stream in conjunction with a portion of the hot gases of combustion and returning the same into said fan for reentry to said wind-box, venting a portion of combustion gases outwardly with respect to the stack axis below the level of the interception of said unconsumed fly-ash material, and withdrawing the residual products of combustion from or near the bottom of said incinerator.

4. The method of claim 3 wherein the temperature in the combustion area of said stack is maintained above 2800 F.

5. The method of claim 3 wherein supplemental fuel of the class consisting of coal, oil, coke and combustible gas is added periodically to the feed waste supply.

References Cited

UNITED STATES PATENTS

| | | | |
|---|---|---|---|
| 952,737 | 3/1910 | Hazelton | 110—120 |
| 1,969,371 | 8/1934 | Hawley | 431—173 X |
| 2,121,465 | 6/1938 | Berg | 266—29 |
| 2,387,693 | 10/1945 | Trevino | 110—8 X |
| 2,483,728 | 10/1949 | Glaeser | 110—28 X |
| 2,524,868 | 10/1950 | Worsham | 110—7 X |
| 2,738,776 | 3/1956 | Burg. | |
| 2,800,092 | 7/1957 | Burg. | |
| 2,804,031 | 8/1957 | Douglass | 110—18 |
| 2,917,011 | 12/1959 | Korner. | |
| 2,961,977 | 11/1960 | Coleman. | |

FOREIGN PATENTS 18,291    1889   Great Britain.

JAMES W. WESTHAVER, Primary Examiner

U.S. Cl. X.R.

110—18